June 3, 1969  R. C. WEISCHEDEL  3,447,626
SEISMIC SENSOR FOR EARTH MOVEMENT CAUSED BY A DETONATION
Filed June 15, 1967
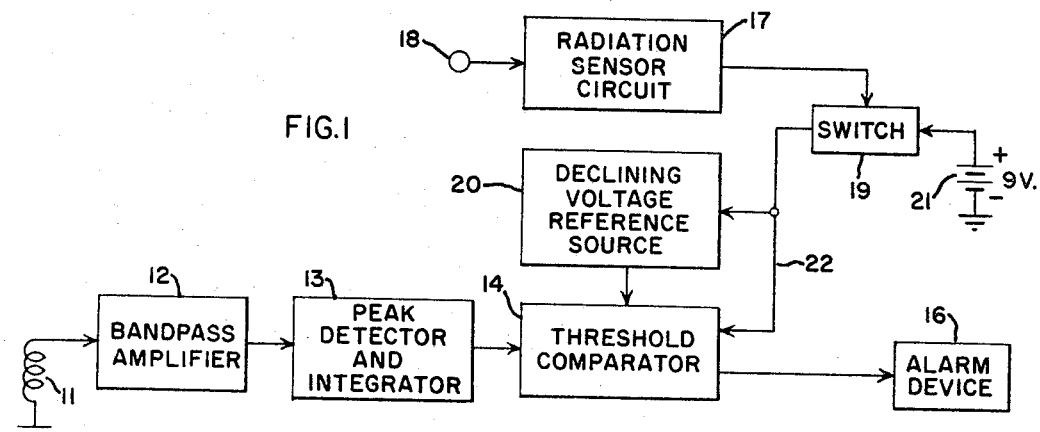
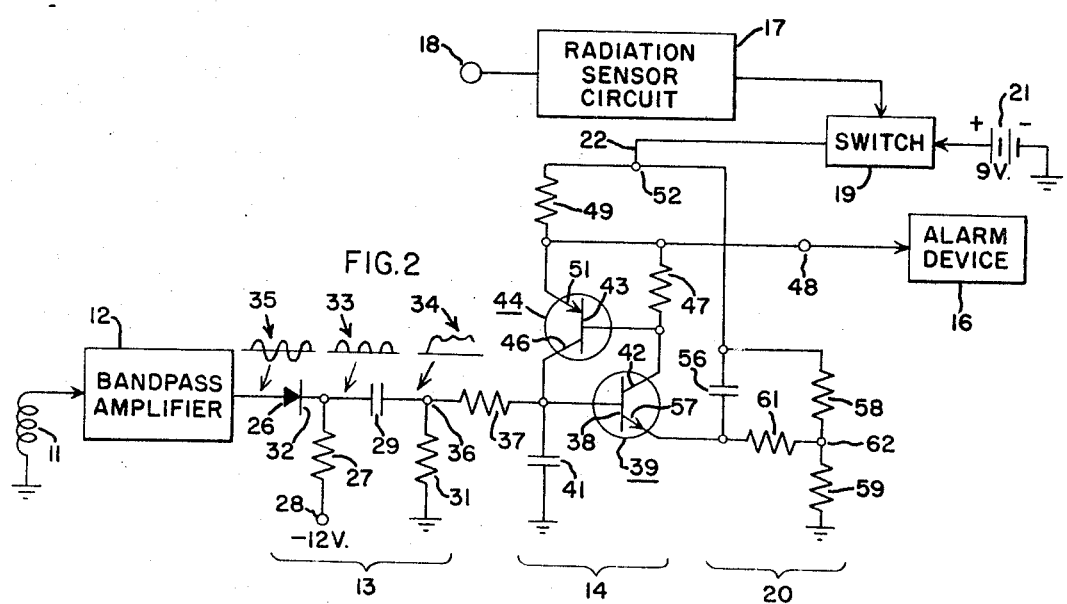
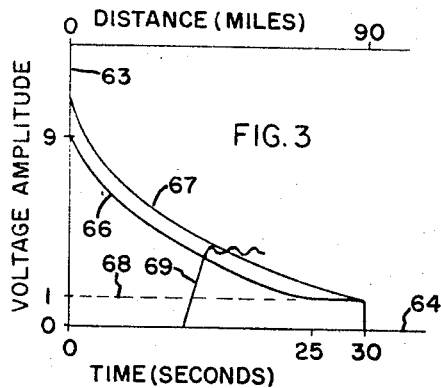
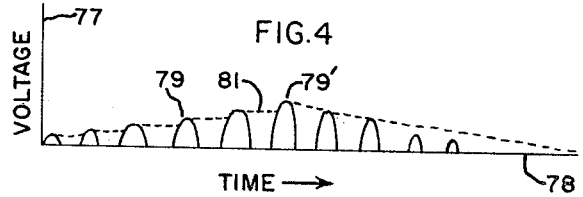
INVENTOR:
RICHARD C. WEISCHEDEL,
BY Norman C. Fulmer
HIS ATTORNEY.

United States Patent Office 3,447,626
Patented June 3, 1969

3,447,626
SEISMIC SENSOR FOR EARTH MOVEMENT CAUSED BY A DETONATION
Richard C. Weischedel, Camillus, N.Y., assignor to General Electric Company, a corporation of New York
Filed June 15, 1967, Ser. No. 646,351
Int. Cl. G01v 1/00
U.S. Cl. 181—.5          8 Claims

ABSTRACT OF THE DISCLOSURE

An improved seismic sensor is disclosed, for use in cooperation with one or more radiation types of sensors, for detection of a distant detonation such as a nuclear explosion. The reliability and accuracy of the seismic sensor are improved by providing therein a time-varying operational threshold level, an operative time limit, a signal integrator, and a signal filter having certain frequency bandpass characteristics.

Background of the invention

Apparatus for detecting distant nuclear explosions has comprised one or more radiation types of sensors—such as an optical sensor or electromagnetic wave sensor—in cooperation with a seismic sensor. When the radiation type equipment detects radiation having characteristics of having been produced by a nuclear detonation, the seismic sensor then detects whether the radiation is followed by earth movement or tremor such as to confirm the occurrence of a nuclear detonation. If such a detonation is thus confirmed, an alarm is sounded and/or other indication made of the event. Also, the time of arrival of the earth tremor after arrival of the radiation, indicates the distance at which the detonation occurred.

Reliability is extremely important in such a system. Not only is it highly desirable to obtain an indication of every nuclear detonation that occurs within detection range of the equipment, but it also is highly desirable that the equipment not produce false indications. Such false indications tend to arise from various sources; for example, radiation caused by lightning; and earth tremors caused by cars, trucks, miscellaneous explosions, and people or animals walking nearby. False indications could result in unnecessary cost, inconvenience, public panic, and lack of credibility of the valid indications of nuclear detonations.

Summary of the invention

Objects of the invention are to provide an improved seismic sensor circuit, and to solve the prior-art problems described above.

The improved seismic sensor of the invention comprises, briefly and in a preferred embodiment, a seismometer connected to circuitry comprising, successively, a bandpass amplifier having a frequency bandpass range of approximately 5 to 20 cycles; a peak detector and an integrator having relatively fast attack and slow decay characteristics; and a time-limited threshold comparator circuit having means connected thereto for providing a threshold level reference voltage having a declining characteristic curve which approximates the declining characteristic curve of earth movement vs. detonation distance. The threshold comparator circuit and the declining threshold level reference voltage menas are connected to radiation sensor means so as to actuated thereby, and are provided with means for limiting the duration of their activation to a time corresponding to the transit time of earth movement from a detonation at the maximum distance of the desired detection range.

Brief description of the drawing

FIGURE 1 is an electrical block diagram of a preferred embodiment of the invention,
FIGURE 2 is a partial electrical schematic diagram of the preferred embodiment, and
FIGURES 3 and 4 are time-plots illustrating operation of the invention.

Description of the preferred embodiment

In the block diagram of a preferred embodiment of the invention as shown in FIGURE 1, a seismometer or geophone 11, which may comprise a probe connected into the ground and a moving coil (in a magnetic field) adapted to generate electrical energy in accordance with earth tremors, is electrically connected to the input of a bandpass amplifier 12 which passes frequencies only in a frequency range of approximately five cycles per second to twenty cycles per second. The output of the bandpass amplifier 12 is connected to the input of a peak detector and integrator circuit 13, the output of which is connected to a threshold comparator circuit 14, the output of which in turn is connected to an alarm device 16. The circuits 13 and 14 will be described more fully with reference to FIGURE 2. The alarm device 16 may comprise an audible indicator, a visual indicator, moving chart recorder, or combinations thereof.

A radiation sensor circuit 17 and associated radiation detctor 18, are adapted to detect and sense radiation in the optical or electromagnetic spectrum such as is radiated from a nuclear detonation, and the output thereof is connected to a time-limit switch 19 which may comprise a delayed multivibrator switch circuit. The radiation sensor ircuit 17 is adapted to actuate the switch 19 when radiation occurs of the type produced by a nuclear detonation. The switch 19, when actuated, connects a voltage source 21, via a connection 22, to the threshold comparator 14 and to a declining voltage reference source 20, the output of which is connected to the threshold comparator 14. It is to be understood that the various circuits shown in the figures are provided with suitable electrical ground connections or other means of electrical common interconnections.

In FIGURE 2, the various stages are indicated by the same numerals as in FIGURE 1. The peak detector and integrator circuit 13 comprises a detector diode 26 connected in the signal path. A resistor 27 is connected between the output electrode of the diode 26 and a point 28 of bias voltage. A capacitor 29 and resistor 31 are connected in series between output electrode 32 of the detector diode 26, and electrical ground. As shown, the detector diode 26 is connected and biased so that it rectifies the positive polarity portions of an incoming signal 35, as indicated at numeral 33. The resistors 27 and 31, and capacitor 29, form an integrator having relatively fast attack and slow decay characteristic. Numeral 34 indicates the integrated shape of the detected signal 33. The fast attack and slow decay characteristic of the integrator are obtained by choosing the value of resistor 27 to be approximately ten times that of resistor 31.

A resistor 37 is connected between the signal output terminal 36 of the peak detector and integrator 13, and the base electrode 38 of a threshold comparator transistor 39 in the threshold comparator circuit 14. A capacitor 41 is connected between the base electrode 38 and the electrical ground. The resistor 37 and capacitor 41 form a high frequency reject filter, for rejecting any high frequency transients that may occur in the preceding circuitry. A collector electrode 42 of the transistor 39 is connected to the base electrode 43 of a feedback transistor 44, the collector electrode 46 of which is connected to the base 38 of transistor 39.

A bias resistor 47 is connected between the collector electrode 42 of transistor 39, and an output terminal 48 of the threshold comparator 14. A load resistor 49 is connected between an emitter electrode 51 of the feedback transistor 44, and a voltage terminal 52 to which voltage from the voltage source 21 is connected by means of the switch 19 when actuated by the radiation sensor circuit 17.

The declining threshold voltage reference source 20 comprises a capacitor 56 connected between the voltage input terminal 52 and the emitter electrode 57 of the comparator transistor 39, a pair of resistor 58, 59 connected in series between the voltage terminal 52 and electrical ground in order to form a voltage divider, and a resistor 61 connected between the emitter electrode 57 of the thresold comparator transistor 39, and the junction 62 of the voltage divider resistor 58 and 59.

The invention functions as follows. Normally, the switch 19 is in the off condition, so that no voltage from the voltage source 21 is applied to the voltage terminal 52 of the threshold comparator 14 and the declining threshold voltage source 20. Therefore, these circuits are inactive and hence the alarm device 16 is inactive. When the radiation detector 18 detects optical and/or electromagnetic radiation of the type produced by a nuclear detonation, the radition sensor circuit 17 actuates the switch 19 (which preferably is a delayed multivibrator circuit, but alternatively could comprise a motor-driven cam switch or other suitable timed switching means), which applied voltage from the voltage source 21 to the connection 22 and voltage input terminal 52 for limited time of, for example, 30 seconds.

When operating voltage is thus applied to terminal 52, the voltage reference capacitor 56 initially has no charge, both plates thereof being at the voltage of terminal 52. The capacitor 56 immediately begins to charger, the lower plate thereof going negatively in the circuit shown, until it assumes the voltage at junction 62 of the voltage divider resistor 58–59. In a preferred embodiment of the invention, the voltage source 21 is nine volts, and the voltage divider resistors 58 and 59 are so chosen that the voltage at the junction 62 thereof will be one volt positive. This capacitor charging voltage is shown by the curve 66 in FIGURE 3, wherein the vertical axis 63 represents voltage and the horizontal axis 64 represents time. The voltage at the lower plate of capacitor 56, which is connected to the emitter 57 of the threshold comparator transistor 39, is nine volts at the instant voltage is applied to the voltgae terminal 52 at time zero, and decreases negatively in accordance with a normal capacitor charging curve (determined by the values of capacitor 56 and resistor 61), until it reaches a value of one volt (as determined by the voltage at junction 62 of the voltage divider resistor 58–59) at about 28 seconds, and discharges to zero volts at thirty seconds when operating voltage is removed from terminal 52 due to the time switch 19 turning off. Thus, the curve 66 in FIGURE 3 indicates the comparison threshold signal bias voltage applied to the emitter electrode 57 of transistor 39. However, the transistor 39 remains inactive unless a suitable signal is applied to its base electrode 38 during the thirty-second time interval to forward bias the base-to-emitter junction thus actuating the threshold comparator 14.

The aforesaid enabling action of the circuitry occurs relatively promptly upon the occurrence of a nuclear detonation, due to the relatively fast propagation time of the radiation energy. The transit time of earth tremor from a nuclear detonation is relatively slow, being at the rate of approximately three miles per second. Thus, in the example given where the circuitry is enabled for a maximum of thirty seconds, the maximum range of the equipment is ninety miles. The range can be made greater, if desired; however, a ninety-mile range normally gives adequate time for determining whether to take precautions against nuclear fall-out. The maximum range obtainable depends on the background noise level in the particular location. The intensity of the earth tremor is a function of distance from the detonation, and it decreases approximately exponentially with distance as indicated by the curve 67 in FIGURE 3.

The earth tremor is detected by the seismometer 11, which generates a seismic signal that is passed through the bandpass amplifier 12 which passes frequencies in a bandwidth lying within outer limits of one cycle per second and twenty cycles per second, and preferably having a bandwith extending from five cycles per second to fifteen cycles per second, which is the more useful frequency range for the seismic signal. Thus, the bandpass amplifier 12 rejects any undesired spurious signals at frequencies outside of the bandpass range, so as to increase the accuracy and reliability of the system. The seismic signal 35 is then rectified by the detector diode 26 thereby producing rectified positive polarity voltage signals 33 which are integrated by the circuit 27, 29, 31 into a signal as indicated by numeral 34 and as will be more fully described with reference to FIGURE 4. After passing through the high frequency reject filter 37, 41, the detected and integrated seismic signal is applied to the base electrode 38 of the threshold comparator transistor 39.

The curve 67 in FIGURE 3 represents the minimum seismic signal amplitude, resulting from a nuclear detonation, that will be applied to the base electrode 38, with respect to time following a nuclear detonation. As will be seen from FIGURE 3, the declining threshold voltage reference 66 lies just below, and is shaped similarly to, the curve 67, i.e. a declining exponential shape of curve. Thus, only a seismic signal having a peak amplitude falling within the area bounded by the curves 66 and 67, will be effective to actuate threshold comparator transistor 39. Prior to the present invention, this type of seismic circuitry employed a fixed threshold reference voltage, which in the example shown would be one volt, as indicated by the dashed line 68, which corresponds to the minimum value of seismic signal 67 that would occur at the end of the thirty-second limit, and therefore the circuit would become actuated by any signal falling within the relatively large area defined by the curves 67 and 68. With the present invention, an increased system reliability against false actuation of ten times or more is readily achieved, this being the ratio of the area bounded by curves 67 and 68, to the area bounded by the curves 66 and 67.

As a specific example, curve 69 in FIGURE 3 shows a proper seismic signal voltage having a peak amplitude falling on the minimum seismic signal amplitude curve 67. This seismic signal will properly actuate the circuitry since its amplitude exceeds the threshold voltage level 66 and it occurs within the thirty-second enabling period. However, if a spurious signal like 69 were received prior to the time shown in FIGURE 3, it would not falsely actuate the circuitry because it would not rise above the threshold curve 66. By way of contrast, in the prior art circuitry having a fixed threshold 68, any signal like 69, whether authentic or not for the purposes of seismic confirmation of a nuclear detonation, would actuate the circuitry.

When a suitable confirmatory seismic signal is applied to the base electrode 38 of transistor 39, such as the signal 69 shown in FIGURE 3, the transistor 39 becomes conductive, generating a signal across its bias resistor 47, which signal is amplified in the feedback transistor 44 and applied to the base electrode 38 of transistor 39. This latches the circuitry in the "on" condition, and generates a signal across its load resistor 49. This signal is applied to the alarm device 16, which in turn produces an audio or visual alarm, and/or makes a chart recording of the nuclear detonation.

The integrator circuit, comprising resistors 27 and 31 and capacitor 29, functions as follows, with reference to FIGURE 4. FIGURE 4 is a graph of voltage amplitude (represented by the vertical axis 77) versus time (represented by the horizontal axis 78), of the positive polarity half cycles (as rectified by the detector 26) of an object moving past the seismometer 11, such as would be produced by a vehicle driving by, or a person or animal walking past. The signal 79 thus produced, begins as low amplitude, increases to a maximum amplitude as indicated at 79', and then declines toward zero with respect to time. Since the integrator circuit 27, 29, 31 is designed for fast attach and slow decay time, the signal becomes integrated to a wave shape indicated by the dashed line 81 in FIGURE 4. The threshold comparator transistor 39 does not respond to the slow-time over-all build up of the integrated dashed-line signal 81, which may require a matter of several seconds or minutes to build up to the maximum amplitude 79', because the integrator capacitor also functions as a low-frequency reject filter. For such an incoming signal, the threshold comparator transistor 39 can be responsive only to the relatively faster rising signal portions such as occur between the end of a declining integrated decay slope and the peak of the next succeeding rectified half cycle. The amplitude of these portions, however, is relatively small, and hence does not falsely actuate the transistor 39.

Thus, the variable threshold voltage level provided on the incoming seismic signal by means of the integrator circuit 27, 29, 31 provides, in accordance with a feature of the invention, effective discrimination against false actuation by earth tremors which build up relatively gradually with respect to time, whereas the circuit effectively becomes actuated by means of a detonation-produced fast-rising earth tremor signal of sufficient amplitude such as indicated by numeral 69 in FIGURE 3.

The invention, through the cooperative action of its variable voltage threshold levels, time-limited enabling period of the seismic circuits, and limited-frequency bandpass characteristics, achieves the desired objectives and provides a seismic sensor arrangement having greatly improved reliability, greater range, and capability of resisting activation by undesired seismic signals. This not only increases credibility of the system, but also reduces the likelihood of unnecessary public panic that could be caused by false indications of nuclear detonation. As a further feature of the invention, the foregoing advantages are achieved with circuitry that is relatively simple, reliable, and inexpensive.

While a preferred embodiment of the invention has been shown and described, various other embodiments and modifications thereof will become apparent to persons skilled in the art, and will fall within the scope of invention as defined in the following claims.

I claim:

1. A seismic sensor for detecting earth tremor following an indication of detonation by means of a radiation sensor, said seismic sensor including a threshold comparator circuit connected to be enabled by said radiation sensor and having a plurality of electrodes, means to detect an earth tremor and generate a seismic voltage in response thereto, and means to apply said seismic voltage to one of said electrodes, wherein the improvement comprises a voltage reference source for generating a time-varying operational threshold voltage which varies in the same direction with respect to time as the time-varying curve of minimum seismic voltage amplitude versus distance from a detonation, and means to apply said time-varying threshold voltage to an electrode of said threshold comparator circuit to variably bias said circuit approximately coincident with said curve of minimum seismic voltage so that only a seismic voltage having an amplitude approximately equal to or greater than that of said curve of minimum seismic voltage amplitude will actuate said threshold comparator circuit.

2. A seismic sensor as defined in claim 1, including timing means connected with said threshold comparator circuit and adapted to limit the time period of said enablement following indication of a detonation by said radiation sensor, to a time corresponding to the travel time of an earth tremor from the maximum rated range of the sensor combination.

3. A seismic sensor as defined in claim 1, including an integrator circuit interposed in the path of the seismic voltage and adapted to integrate the seismic voltage to prevent actuation of said threshold comparator circuit by a seismic signal of gradually increasing amplitude such as caused by an approaching person or vehicle.

4. A seismic sensor as defined in claim 1, including a bandpass filter interposed in the path of the signal produced by said means for detecting an earth tremor, said bandpass filter having a bandpass characteristic lying within outer limits of approximately one cycle per second and twenty cycles per second.

5. A seismic sensor as defined in claim 1, in which said voltage reference source generates a time-varying operational threshold voltage having a characteristic curve of amplitude versus time which is exponential and similar to said time-varying curve of minimum seismic voltage amplitude versus distance from a detonation.

6. A seismic sensor as defined in claim 5, in which said voltage reference source comprises a capacitor, a resistor, and a direct voltage source, and means for causing said capacitor to charge through said resistor from said direct voltage source whenever said radiation sensor indicates the occurrence of a detonation.

7. A seismic sensor as defined in claim 6, including a switch means connected to apply voltage, when actuated, from said direct voltage source to said capacitor and to said threshold comparator circuit, said switch means being connected to said radiation sensor circuit so as to be actuated thereby.

8. A seismic sensor for detecting earth tremor from detonations and comprising a seismic detector and a threshold comparator circuit connected to receive seismic voltage signals from said detector, wherein the improvement comprises an integrator circuit interposed in the path of said seismic voltage signals and adapted to integrate the seismic voltage to prevent actuation of said threshold comparator circuit by a seismic signal of gradually increasing amplitude such as caused by an approaching person or vehicle.

References Cited

UNITED STATES PATENTS 2,956,168 10/1960 Pinckaers _____ 250—83.6
3,122,641 2/1964 Pinckaers _____ 250—83.3

BENJAMIN A. BORCHELT, *Primary Examiner.*

T. H. WEBB, *Assistant Examiner.*

U.S. Cl. X.R.

250—83.3